United States Patent
Imano et al.

(10) Patent No.: US 8,813,679 B2
(45) Date of Patent: Aug. 26, 2014

(54) PAINT MIST COLLECTING DEVICE AND PAINT BOOTH USING THE SAME

(75) Inventors: Masanobu Imano, Tokyo (JP); Takayuki Tahara, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 175 days.

(21) Appl. No.: 13/410,594

(22) Filed: Mar. 2, 2012

(65) Prior Publication Data

US 2013/0061802 A1  Mar. 14, 2013

(30) Foreign Application Priority Data

Mar. 9, 2011  (JP) ................................ 2011-051863

(51) Int. Cl.
 *B05B 15/12* (2006.01)
 *B01D 47/06* (2006.01)
 *B01D 47/02* (2006.01)
 *B05B 13/04* (2006.01)

(52) U.S. Cl.
 CPC ............. *B01D 47/06* (2013.01); *B05B 15/1222* (2013.01); *B05B 13/0452* (2013.01); *B05B 15/1225* (2013.01); *B05B 15/1266* (2013.01); *B01D 47/025* (2013.01); *B01D 2247/04* (2013.01); *B05B 15/1281* (2013.01); *B05B 15/1292* (2013.01); *Y10S 118/07* (2013.01); *Y10S 55/46* (2013.01)
 USPC ... 118/326; 118/DIG. 7; 454/49; 55/DIG. 46; 96/328

(58) Field of Classification Search
 CPC .. B05B 15/12; B05B 15/1281; B05B 15/1225
 USPC ....... 118/326, 324, DIG. 7, 634; 96/322–328; 454/49, 50, 53–55; 55/DIG. 46
 See application file for complete search history.

(56) References Cited

U.S. PATENT DOCUMENTS 5,336,283 A * 8/1994 Horisawa ........................ 96/328
6,093,250 A * 7/2000 Salazar et al. ................ 118/668

FOREIGN PATENT DOCUMENTS

JP     2008-149249 A    7/2008

* cited by examiner

*Primary Examiner* — Yewebdar Tadesse
(74) *Attorney, Agent, or Firm* — Carrier Blackman & Associates, P.C.; Joseph P. Carrier; William D. Blackman

(57) ABSTRACT

A paint mist collecting device for collecting a mist of paint particles produced when a paint is sprayed onto a workpiece within a paint booth includes a tubular duct having one end adapted to be connected to an outlet of the paint booth from which air containing the paint mist and a cleaning air are allowed to flow out, and a swirl-generating guide fin unit disposed inside the tubular duct and configured to force axial flows of the paint-mist-containing air and the cleaning liquid into a rotational movement to thereby generate a helical vortex as the paint-mist-containing air and the cleaning liquid flow downward along the tubular duct.

8 Claims, 8 Drawing Sheets

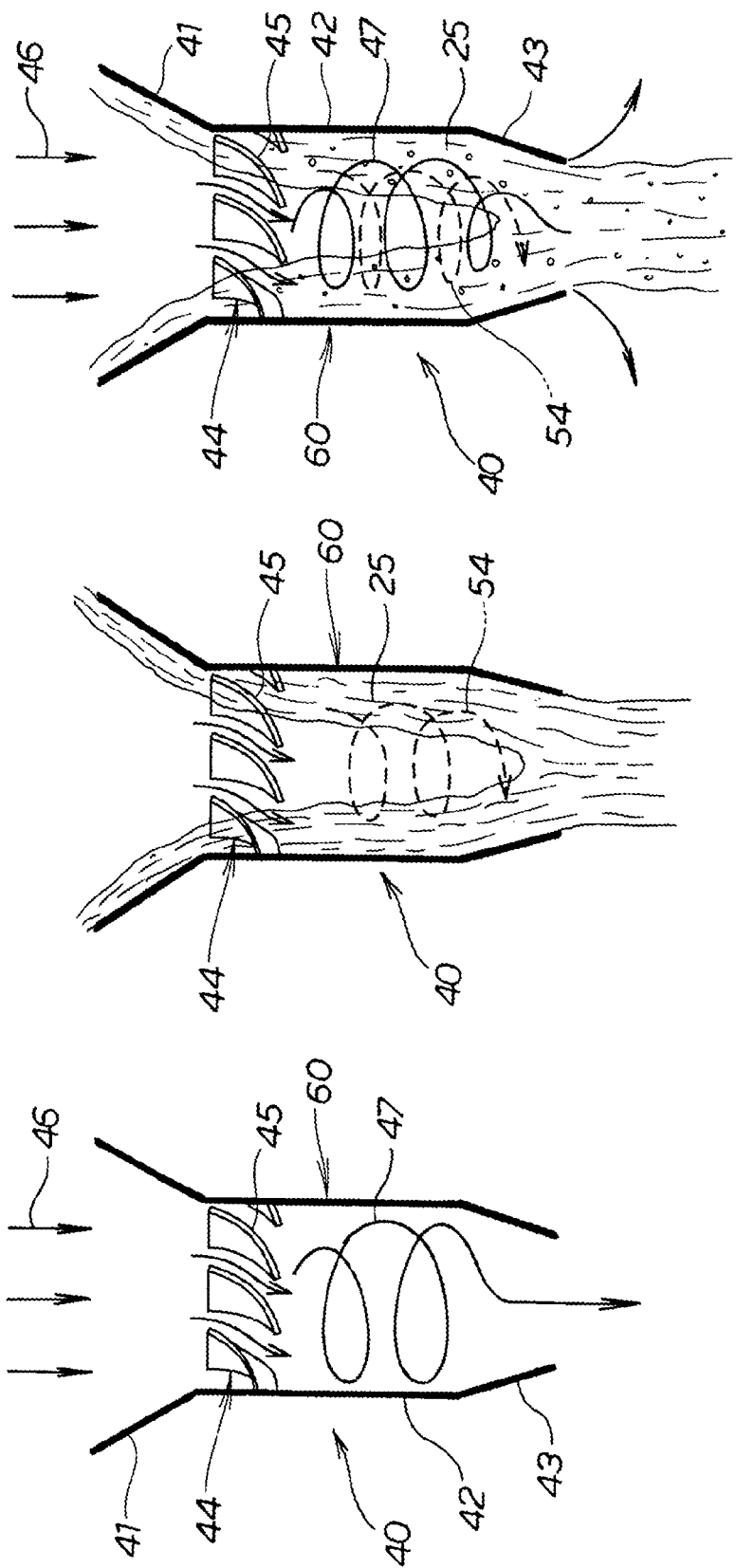

PAINT MIST COLLECTING DEVICE AND PAINT BOOTH USING THE SAME

FIELD OF THE INVENTION

The present invention relates to a paint mist collecting device for collecting a mist of paint particles floating within a paint booth and also to a paint booth using such paint mist collecting device.

BACKGROUND OF THE INVENTION

Paint particles sprayed from a paint gun or a like painting means are applied onto an object to be coated (hereinafter referred to as "workpiece") within a paint booth. In this instance, uncoated paint particles float as a mist around the workpiece in an atmosphere of a paint booth. In order to secure a desired painting quality, a mist of paint particles should be promptly removed from the surroundings of the workpiece.

To this end, it has been a common practice that clean air supplied from an upper part of the paint booth flows downwards toward the workpiece, while at the same time, dirty air containing the paint mist is discharged from a bottom of the paint booth. From a standpoint of environmental protection, the paint mist must be removed from the dirty air before the air is vented to atmosphere.

To meet the requirement, the paint booth is generally provided with a paint mist collecting device, such as disclosed in Japanese Patent Application Laid-open Publication (JP-A) No. 2008-149248.

As shown here in FIG. 9, a wet booth circulation water treatment system disclosed in JP 2008-149248A includes a water tank 101 in which a circulation water is stored and purified. The purified circulation water is pumped up from the water tank 101 and supplied via a water supply line 104 into a paint booth 105 by means of a pump 103. The paint booth 105 has a bottom wall 106 formed into a V-shape. The supplied circulation water flows into a central outlet 107 formed in the V-shaped bottom wall 106 and falls down from the central outlet 107 during which time air containing the paint mist is entrained in the circulation water. In this instance, the air is washed with the circulation water and hence is purified.

Then, the circulation water and the air are separated from one another according to the difference in specific gravity, and the circulation water is allowed to further flow downward and eventually returns to the water tank 101. The air containing the paint mist is held in contact with the circulation water for a time period beginning from its entry to the central outlet 107 and ending at its separation from the circulation water. This contact time is not considered to be sufficiently long. In order to achieve a desired purification effect within such a limited contact time, an increased quantity of circulation water must be supplied. However, this requires a large-capacity pump, which will increase the running cost.

It is accordingly an object of the present invention to provide a paint mist collecting device which is capable of collecting a mist of paint particles floating within a paint booth without requiring a large quantity of cleaning liquid.

Another object of the present invention is to provide a paint booth equipped with such paint mist collecting device.

SUMMARY OF THE INVENTION

According to one aspect of the present invention, there is provided a paint mist collecting device for use in a paint booth for collecting a mist of paint particles produced when a paint is sprayed onto a workpiece within the paint booth while air containing the paint mist and a cleaning liquid are allowed to flow out from an outlet formed at a bottom part of the paint booth. The paint mist collecting device comprises: a tubular duct having one end adapted to be connected to the outlet of the paint booth; and a swirl-generating guide fin unit disposed inside the tubular duct and configured to force axial flows of the paint-mist-containing air and the cleaning liquid into a rotational movement to thereby generate a helical vortex as the paint-mist-containing air and the cleaning liquid flow downward along the tubular duct.

By thus generating a helical vortex of the paint-mist-containing air and the cleaning liquid, the paint-mist-containing air can stay in the tubular duct for a relatively long time, which will increase a contact time between the paint-mist-containing air and the cleaning liquid. This means that the paint mist can be entrained in the cleaning liquid with increased efficiency and the necessary amount of cleaning liquid can be reduced.

Preferably, the tubular duct includes a frustconical intake section, a cylindrical intermediate section, and a tapered nozzle section arranged in an axial direction of the tubular duct with the intermediate section disposed between the intake section and the nozzle section. The frustconical intake section has a large-diameter end forming the one end of the tubular duct. The cylindrical intermediate section has a uniform diameter throughout the length thereof. The tapered nozzle section has a diameter gradually reducing in a direction toward an opposite end of the tubular duct. The swirl-generating guide fin unit is disposed in the intermediate section at a position near a small-diameter end of the frustconical intake section. The tapered nozzle section serves to restrict downward flow of the paint-mist-containing air and the cleaning liquid, thereby facilitating mixing of the paint-mist-containing air and the cleaning liquid.

Preferably, the swirl-generating guide fin unit comprises a plurality of guide fins projecting from an inner surface of the tubular duct and circumferentially spaced at equal intervals, the guide fins being skewed with respect to a longitudinal axis of the tubular duct in a direction to form a clockwise or a counter-clockwise swirl flow of the paint-mist-containing air and the cleaning liquid. The skew direction (i.e., the direction of the swirl flow) may be selected in view of the position of the outlet relative to a travel path of the workpiece within the paint booth.

Preferably, the tubular duct has a circumferential groove formed in an inner surface thereof and located adjacent to the one end of the tubular duct, and a liquid-jetting means for jetting the cleaning liquid into the circumferential groove to form a swirl flow of the cleaning liquid in a direction same as a direction of rotational movement produced by the swirl-generating guide fin unit. With this arrangement, since the cleaning liquid is forced into a swirl movement at the intake section of the tubular duct located upstream of the swirl-generating guide fin unit, the cleaning liquid can stay in the tubular duct for a longer time and, hence, a contact time between the cleaning liquid and the paint-mist-containing-air further increases. This means that the paint mist can be entrained in the cleaning liquid at higher efficiency.

According to another aspect of the present invention, there is provoded a paint booth comprising: a painting pit for receiving therein a workpiece to be painted, the painting pit having a bottom wall and at least one outlet formed in the bottom wall; a painting means disposed in the painting pit for spraying a paint onto the workpiece; means for supplying air from above into the painting pit; means for supplying a cleaning liquid over the bottom wall of the painting pit, wherein air containing a mist of paint particles produced when the paint is sprayed onto the workpiece and the cleaning liquid are allowed to flow out through the outlet formed in the bottom wall; and a paint mist collecting device for collecting the paint mist, wherein the paint mist collecting device comprises; a tubular duct connected at one end to the outlet of the painting pit and extending downward; and a swirl-generating guide fin unit disposed inside the tubular duct and configured to force axial flows of the paint-mist-containing air and the cleaning liquid into a rotational movement to thereby generate a helical vortex as the paint-mist-containing air and the cleaning liquid flow downward along the tubular duct.

The paint booth further includes a conveyor disposed in the painting pit for conveying the workpiece in a direction along a travel path. The painting pit has a first row of outlets disposed on a right side of the travel path as view in the direction of conveyance of the workpiece, and a second row of outlets disposed on a left side of the travel path as viewed in the direction of conveyance of the workpiece. The swirl-generating guide fin unit of the paint mist collecting device, which is associated with each of the first row of outlets, is configured to generate a clockwise swirl flow of the paint-mist-containing air and the cleaning liquid, and the swirl-generating guide fin unit of the paint mist collecting device, which is associated with each of the second row of outlets, is configured to generate a counterclockwise swirl flow of the paint-mist-containing air and the cleaning liquid. With this arrangement, the paint-mist-containing air is centered toward the travel path without adhering or staying to sidewalls of the paint booth and, hence, the paint mist recovery efficiency increases further.

Preferably, the painting pit has a third row of outlets aligned with the travel path, and the first and second rows of outlets and the third row of outlets are arranged in a zigzag alignment. Even when the third row of outlets are temporarily closed by the workpiece while being conveyed, the first and second rows of outlets can maintain their prescribed function.

BRIEF DESCRIPTION OF THE DRAWINGS

Certain preferred structural embodiments of the present invention will be described in detail herein below, by way of example only, with reference to the accompanying sheets of drawings, in which:

FIGS. 4A through 4C are diagrammatical views illustrative of the operation of the paint mist collecting device;

DETAILED DESCRIPTION OF THE PREFERRED EMBODIMENTS

Figure 1:
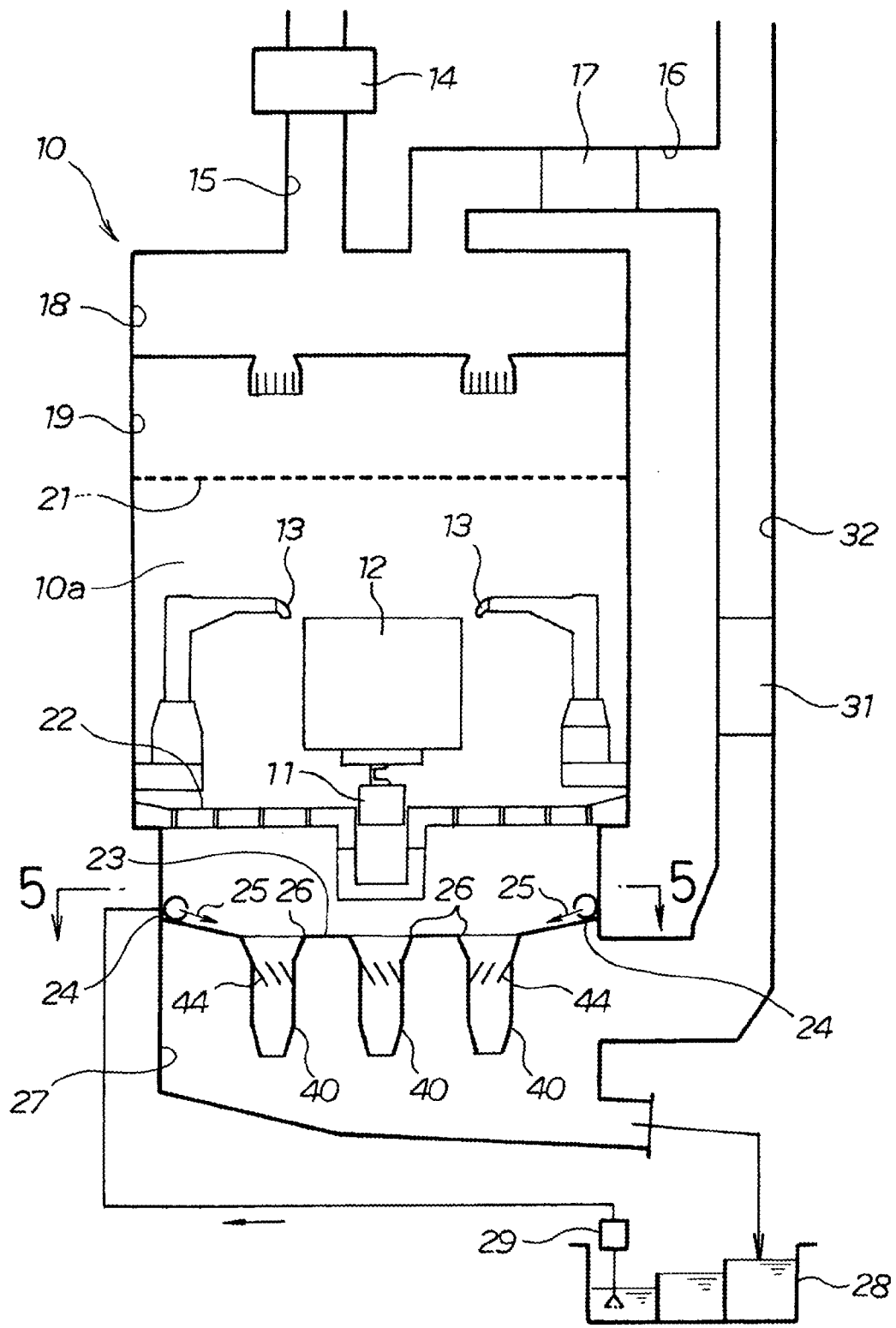
FIG. 1 is a diagrammatical view showing a general configuration of a paint booth in which a paint mist collecting device embodying the invention is incorporated.

Referring now to the drawings and FIG. 1 in particular, there is shown a general configuration of a paint booth 10 embodying the present invention. The paint booth 10 in the illustrated embodiment is an automotive paint booth and includes a conveyor 11 for conveying a vehicle body (workpiece) 12 in a direction (perpendicular to a plane of the drawing sheet) along a path of travel TR, and a painting means 13 disposed on each side of the conveyor 11 for spraying a paint onto the workpiece 12. The conveyor 11 and the painting means 13 are disposed in a painting pit 10a.

The paint booth 10 is hermetically sealed except an entrance and an exit, and fresh air is supplied downward into the spray booth 10 via a duct 15 after the air is conditioned in temperature, humidity and cleanliness by a fresh air-conditioner 14 disposed at an inlet of the duct 15. Furthermore, air is also supplied into the paint booth 10 via a return duct 16 after the air is conditioned in temperature, humidity and cleanliness by a recycling air-conditioner 17 disposed in the return duct 16.

The supplied air enters plenum chambers 18, 19 in which the air is forced to slowly distribute uniformly over the entire area of each respective plenum chamber 18, 19. Then the air flows downward through a wire-grid ceiling 21. The air, as it flows downward, carries or entrains a mist of paint particles floating around the workpiece 12, then passes downward through a wire-grid floor 22 and reaches a space defined between the wire-grid floor 22 and a bottom wall 23 of the painting pit 10a. The fresh air-conditioner 14, recycling air-conditioner 17, ducts 15, 16, plenum chambers 18, 19 and wire-grid ceiling 21 form an air supplying means.

A cleaning liquid 25 is supplied from a spray pipe 24 over an inside surface of the bottom wall 23. The bottom wall 23 has a plurality of outlets 26 through which the air containing the paint mist and the cleaning liquid 25 are allowed to enter a gas-liquid separation chamber 27 provided below the painting pit 10a. In the gas-liquid separation chamber 27, the air and the cleaning liquid 25 are separated according to the difference in specific gravity. Thereafter, the cleaning liquid 25 is guided into a liquid storage tank 28 for purification, and purified cleaning liquid 25 is supplied by a pump 29 to the spray pipe 24. The air is drawn from the gas-liquid separation chamber 27 by an exhaust fan 31 and guided into an exhaust duct 32 where a part of the guided air flows into the return duct 16 and the remaining part of the guided air is discharged to atmosphere. The spray pipe 24 and the pump 29 together form a cleaning liquid supply means.

Figure 2:
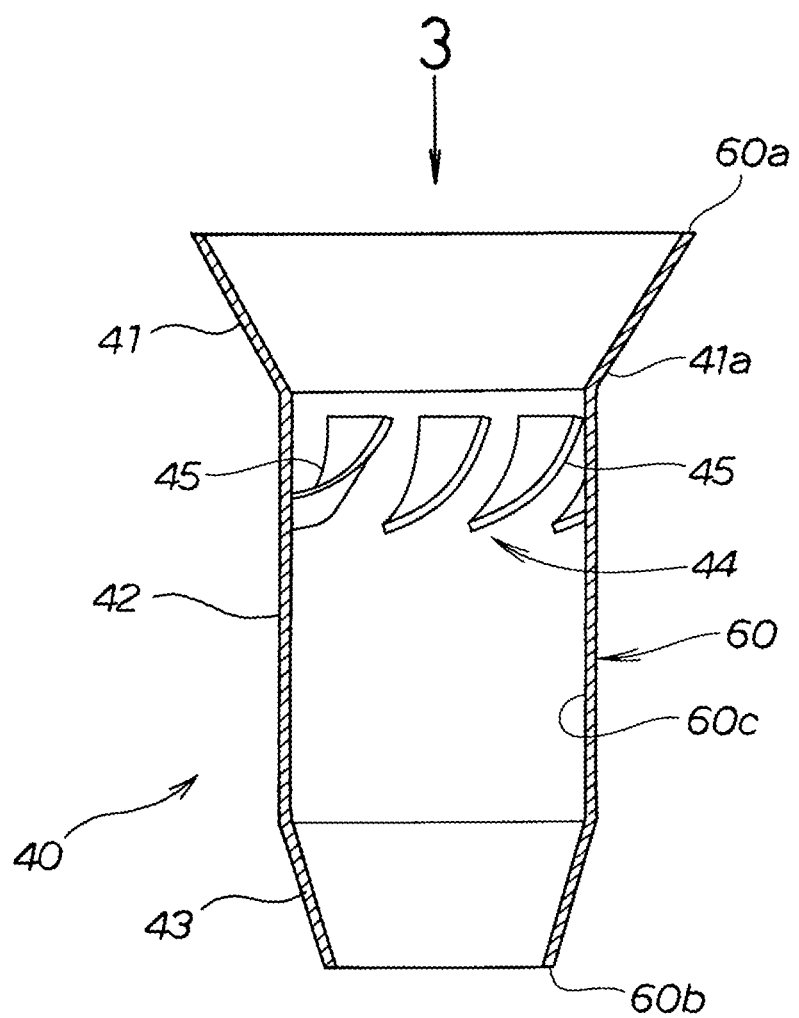
FIG. 2 is a longitudinal cross-sectional view of the paint mist collecting device.

The paint booth 10 further includes a paint mist collecting device 40 associated with each of the outlets 26. As shown in FIG. 2, the paint mist collecting device 40 generally comprises a tubular duct 60 having one end (upper end in FIG. 2) 60a connected to the associated outlet 26, and a swirl-generating guide fin unit 44 disposed inside the tubular duct 60 and configured to force axial flows of the air containing the paint mist (hereinafter referred to as "paint-mist-containing air") and the cleaning liquid 25 into a rotational movement to thereby generate a helical vortex (swirl flow) as the paint-mist-containing air and the cleaning liquid 26 flow downward along the tubular duct 60.

Stated more specifically, the tubular duct 60 includes a frustconical intake section 41, a cylindrical intermediate section 42, and a tapered nozzle section 44 that are arranged in an axial direction of the tubular duct 60 with the intermediate section 42 disposed between the intake section 41 and the nozzle section 43. The frustconical intake section 41 has a large-diameter end (upper end in FIG. 2) and a small-diameter end (lower end in FIG. 2), the large diameter end forming the aforesaid one end 60a of the tubular duct 60 where the tubular duct 60 is connected to the outlet 26. The cylindrical intermediate section 42 has a uniform diameter throughout the length thereof. The tapered nozzle section 43 has a diameter gradually reducing in a direction toward an opposite end (lower end in FIG. 2) 60b of the tubular duct 60. The swirl-generating guide fin unit 44 is disposed in the cylindrical intermediate section 42 and located at a position near the small-diameter end 41a of the frustconical intake section 41.

Figure 3A:
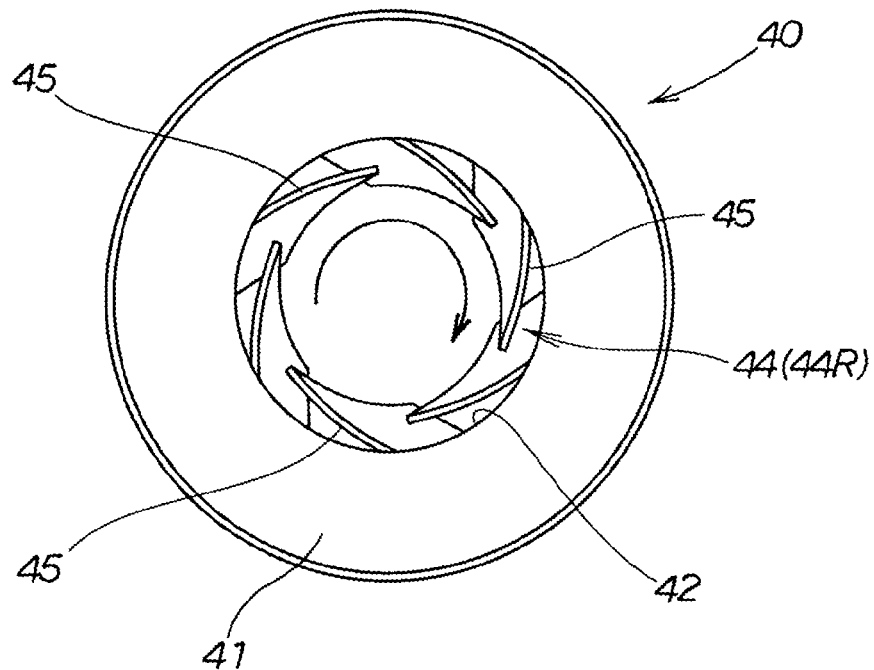
FIG. 3A is a top plan view of the paint mist collecting device shown in FIG. 2, having guide fins arranged to produce a clockwise swirl flow.

As shown in FIGS. 2 and 3A, the swirl-generating guide fin unit 44 comprises a plurality (six in the illustrated embodiment) of guide fins 45 projecting from an inner surface 60c (FIG. 2) of the tubular duct 60 and circumferentially spaced at equal intervals. The guide fins 45 are curved downward and skewed with respect to a longitudinal axis of the tubular duct 60 in a direction to form a clockwise swirl flow of the paint-mist-containing air and the cleaning liquid 25 when they pass through the swirl-generating guide fin unit 40. The swirl generating guide fin unit 44 having such guide fins 45 may be referred to as a clockwise-swirl-generating guide fin unit 44R (FIG. 3A) according to the direction of a swirl flow produced by the guide fins 45.

Figure 3B:
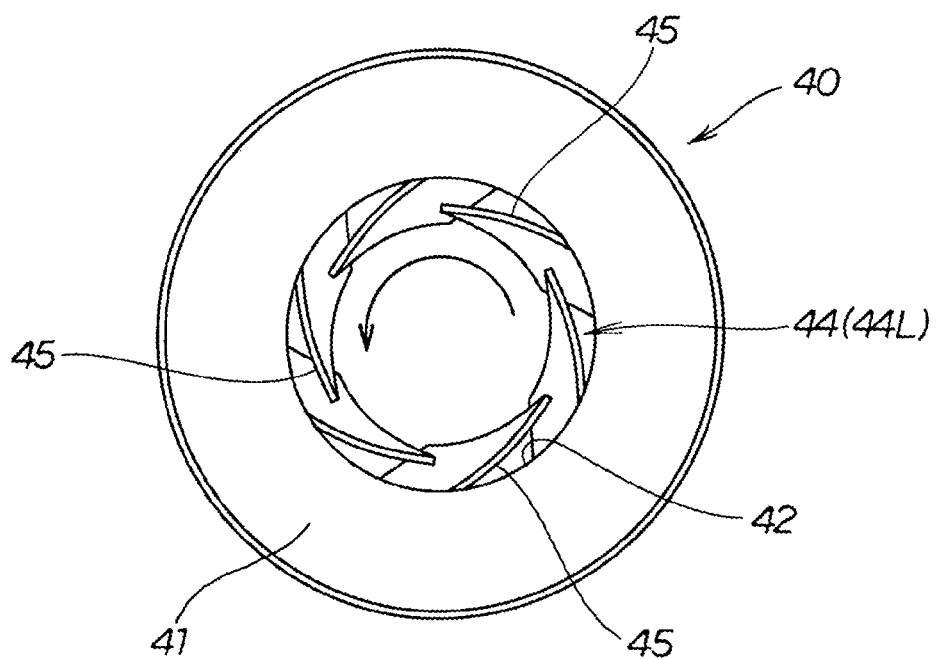
FIG. 3B is a view similar to FIG. 3A, but showing a paint mist collecting device having guide fins arranged to produce a counterclockwise swirl flow.

The guide fins 45 shown in FIG. 3B are skewed in an opposite direction to form a counterclockwise swirl flow of the paint-mist-containing air and the cleaning liquid 25 as the paint-mist containing air and the cleaning liquid 25 pass through the swirl-generating guide fin unit 44. Thus, the swirl-generating guide fin unit 44 having such guide fins 45 may be referred to as a counterclockwise-swirl-generating guide fin unit 44L according to the direction of a swirl flow formed by the guide fins 45.

Operation of the paint mist collecting device 40 will be described with reference to FIGS. 4A through 4C, wherein FIG. 4A shows only a flow of the paint-mist-containing air, FIG. 4B shows only a flow of the cleaning liquid 25, and FIG. 4C shows the flow of the paint-mist-containing air and the flow of the cleaning liquid 25 in combination.

As shown in FIG. 4A, the paint-mist-containing air 46, as it flows downward, enters the tubular duct 60 from the frustconical intake section 41 and comes in contact with the guide fins 45 of the swirl-generating guide fin unit 44. In this instance, the guide fins 45 force an axial flow of the paint-mist containing air 46 into a rotational movement in the clockwise direction. Due to this clockwise swirling of the paint-mist-containing air 46, a helical vortex 47 is generated downstream of the swirl-generating guide fin unit 44. Advancing movement in a downward direction of the paint-mist-contained air is restricted by the tapered nozzle section 43 and, hence, the paint-mist-containing air can stay within the tubular duct 60 for a relatively long time.

As shown in FIG. 4B, the cleaning liquid 25 enters the tubular duct 60 from the frustconical intake section 41 and flows into the swirl-generating guide fin unit 44. In this instance, the guide fins 45 of the swirl-generating guide fin unit 44 force an axial flow of the cleaning liquid 25 into a rotational movement. The cleaning liquid 25 flows downstream along the inner surface of the tubular duct 60 while forming a helical vortex 54 at the center of rotation.

As shown in FIG. 4C, the paint-mist-containing air forms a swirl flow (helical vortex 47) as it flows downward along the tubular duct 60. This swirling of the paint-mist-containing air greatly increases a contact time between the paint-mist-containing air and the cleaning liquid 25, which will ensure that the paint mist can be entrained in the cleaning liquid 25 with increased efficiency. This means that only a relatively small amount of cleaning liquid can efficiently entrain or adsorb the paint mist and, hence, the necessary amount of cleaning liquid can be reduced.

Figure 5:
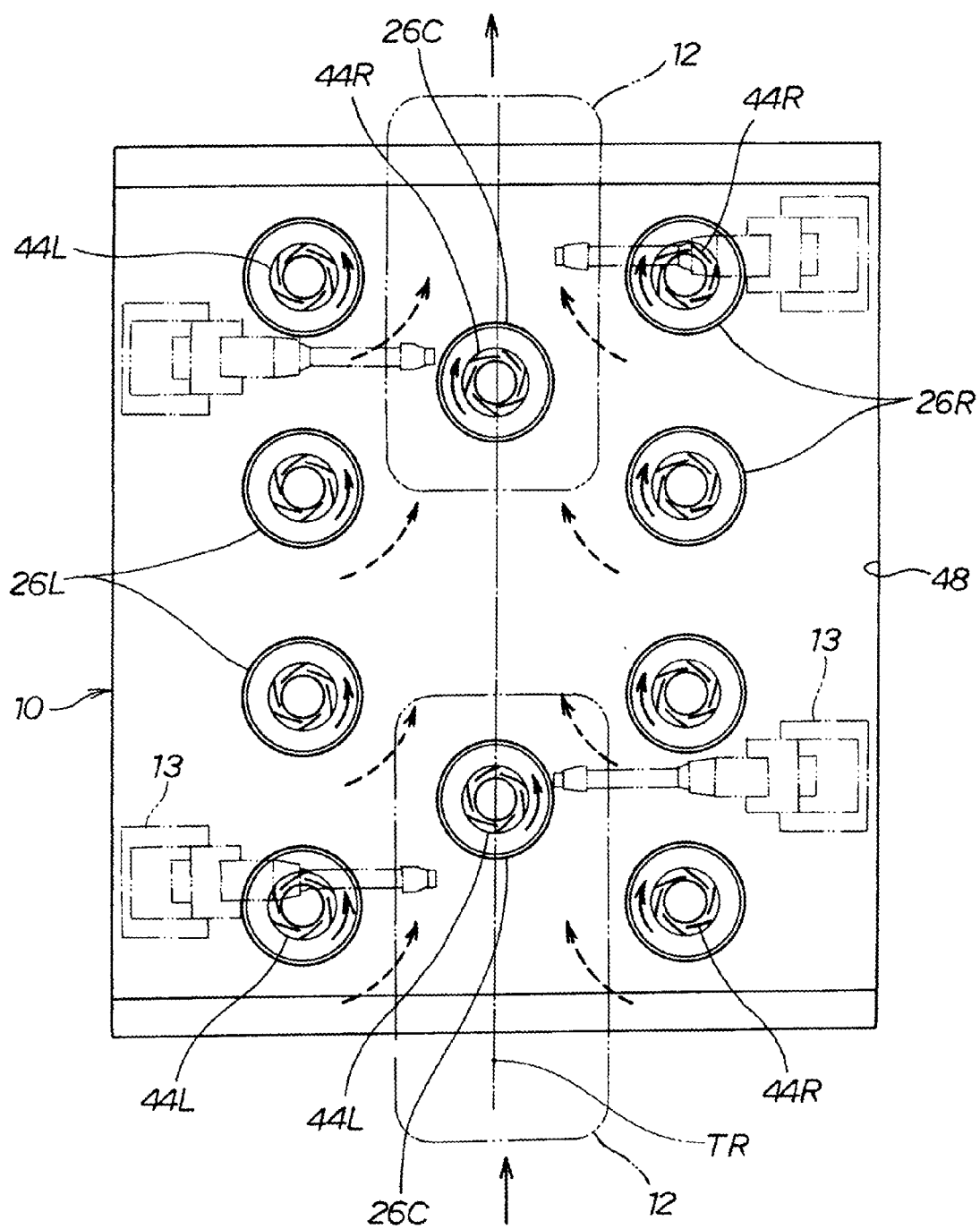
FIG. 5 is a sectional plan view taken along the line 5-5 of FIG. 1.

A description will be next made about an arrangement of the outlets 26 with reference to FIG. 5. As shown in FIG. 5, the plural outlets 26 are arranged in three rows along the travel path TR of the workpiece 12. A row of central outlets 26C is aligned with on the travel path TR, a row of left outlets 26L is disposed on a left side of the travel path TR as viewed in a direction of travel of the workpiece 12, and a row of right outlets 26R is disposed on a right side of the travel path TR as viewed in the travel direction of the workpiece 12. The left and right outlets 26L, 26R and the central outlets 26C are arranged in zigzag alignment with each other along the travel path TR of the workpiece 12.

The central outlets 26C are intermittently closed by the workpiece 12 while the workpiece 12 moves along the travel path TR. However, by virtue of the zigzag alignment, the left and right outlets 26L, 26R can maintain their prescribed function as a fluid passage even when the central outlets 26C are temporarily closed by the workpiece 12.

In the preferred embodiment shown in FIG. 5, the counterclockwise-swirl-generating guide fin unit 44L is used in combination with each of the left outlets 26L, and the clockwise-swirl-generating guide fin unit 44R is used in combination with each of the right outlets 26R. The counterclockwise-swirl-generating guide fin unit 44L and the clockwise-swirl-generating guide fin unit 44R are arranged alternately when whey used in combination with the central outlets 26C. With this arrangement, streams of air in the paint booth 10 are gathered toward a central area of the paint booth 10 as indicated by dashed arrows in FIG. 5. As a result, an amount of paint mist adhering and accumulated on left and right sidewalls 48 of the paint booth 10 decreases and the mist collecting performance of the paint booth 10 increases greatly.

Figure 6A:
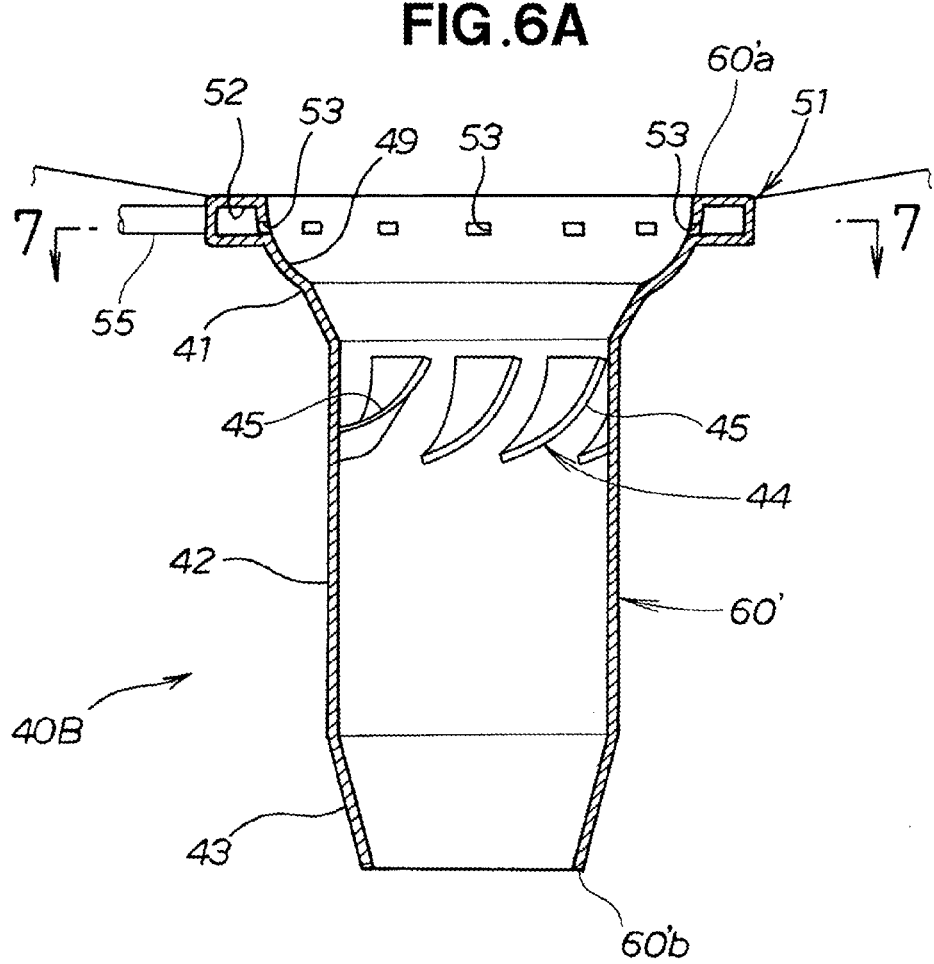
FIG. 6A is a view similar to FIG. 2, but showing a paint mist collecting device according to a second embodiment of the present invention.

Next, a paint mist collecting device according to a second embodiment of the present invention will be described with reference to FIGS. 6A and 6B, FIG. 7 and FIGS. 8A and 8B. As shown in FIG. 6A, the paint mist collecting device 40B includes a tubular duct 60' having a frustconical intake section 41, a cylindrical intermediate section 42 and a tapered nozzle section 43, and a swirl-generating guide fin unit 44 disposed in the cylindrical intermediate section at a position near a small-diameter end (not designated) of the frustconical intake section 41. The tubular duct 60' has a circumferential groove 49 formed in an inner surface thereof and located adjacent to an upper end 60'a thereof, and a liquid-jetting means 51 for jetting the cleaning liquid 25 into the circumferential groove 49 to thereby form a swirl flow of the cleaning liquid 25. The circumferential groove 49 is formed in an inner surface of the frustconical intake section 41 and located adjacent to a large-diameter end thereof. The liquid-jetting means 51 is provided on the frustconical intake section 41.

Figure 7:
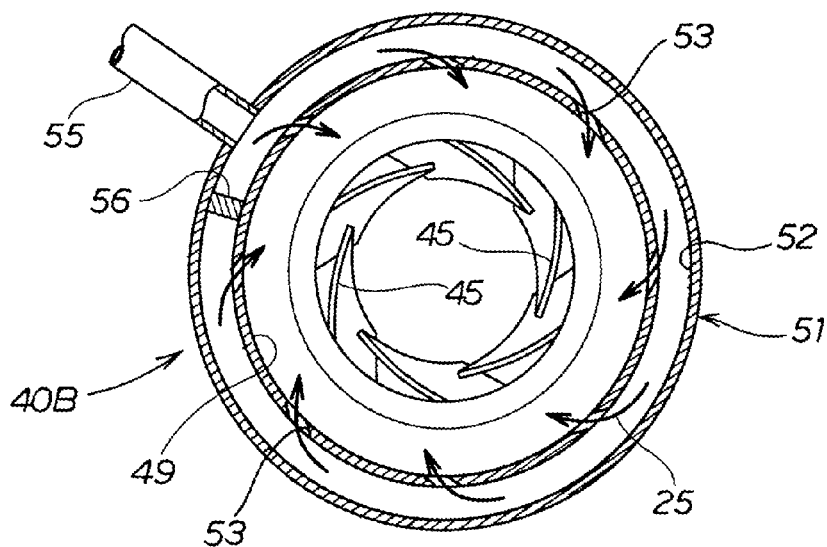
FIG. 7 is a cross-sectional view taken along the line 7-7 of FIG. 6A.

As shown in FIG. 7, the liquid-jetting means 51 is comprised of an annular chamber 52 extending around an outer circumference of the large-diameter end 60'a of the frustconical intake section 41, a plurality of nozzles 53 extending from the annular chamber 52 at an angle to a radial axis of the tubular duct 60' and opening to the inner surface of the frustconical intake section 41 for ejecting the cleaning liquid 25 into the circumferential groove 49 in a direction same as a direction of a swirl flow formed by the swirl-generating guide fin unit 44, a liquid supply pipe 55 connected at one end to the annular chamber 52 for supplying the cleaning liquid 25, and a partition wall 54 disposed in the annular chamber 52 for limiting a flow of the cleaning liquid 25 within the annular chamber 52 to one direction.

Figure 6B:
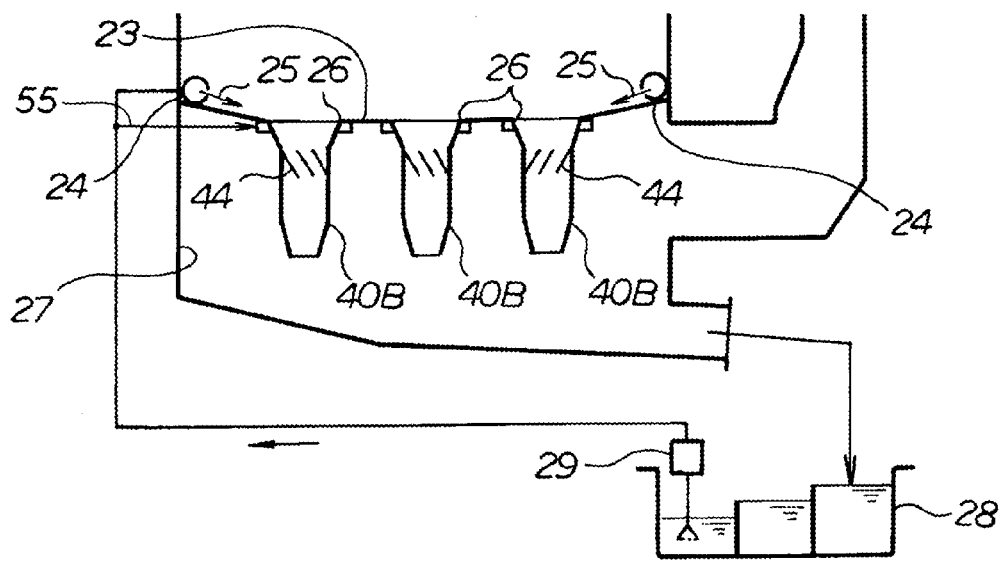
FIG. 6B is a diagrammatical view showing a bottom part of the paint booth in which the paint mist collecting device of FIG. 6A is incorporated.

As shown in FIG. 6B, the liquid supply pipe 55 may be branched from a pipe extending between the pump 29 and the spray pipe 24. As an alternative, the liquid supply pipe 55 may be connected to a separate pump.

Figure 8A:
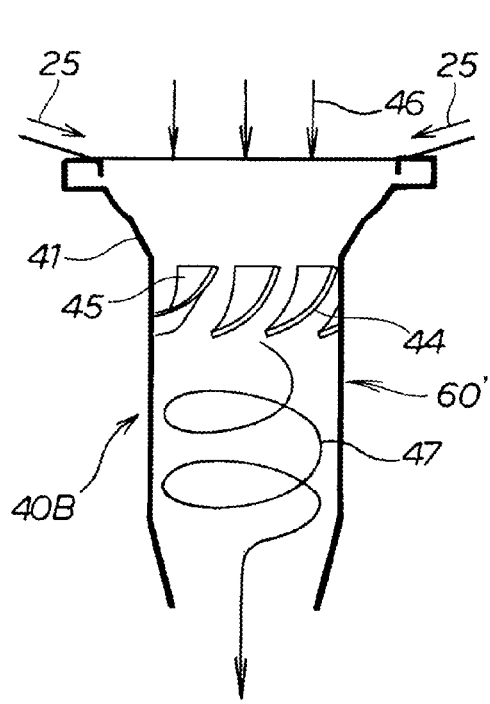
FIGS. 8A and 8B are diagrammatical views illustrative of the operation of the paint mist collecting device shown in FIG. 6A.
Figure 8B:
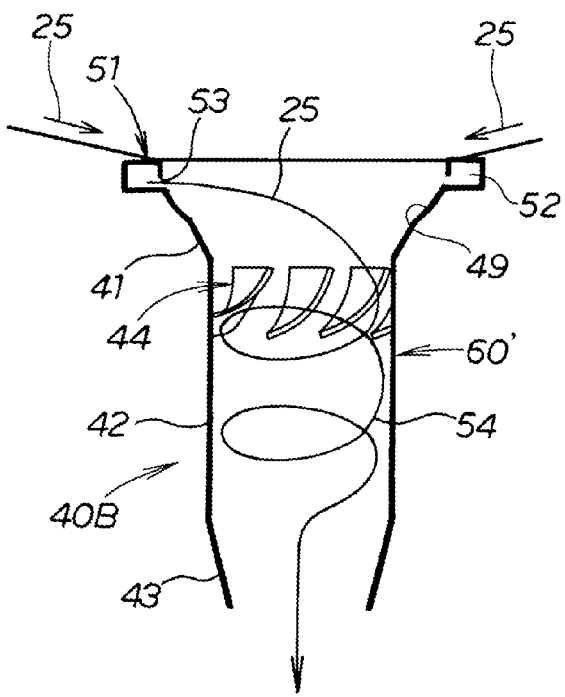
Figure 9:
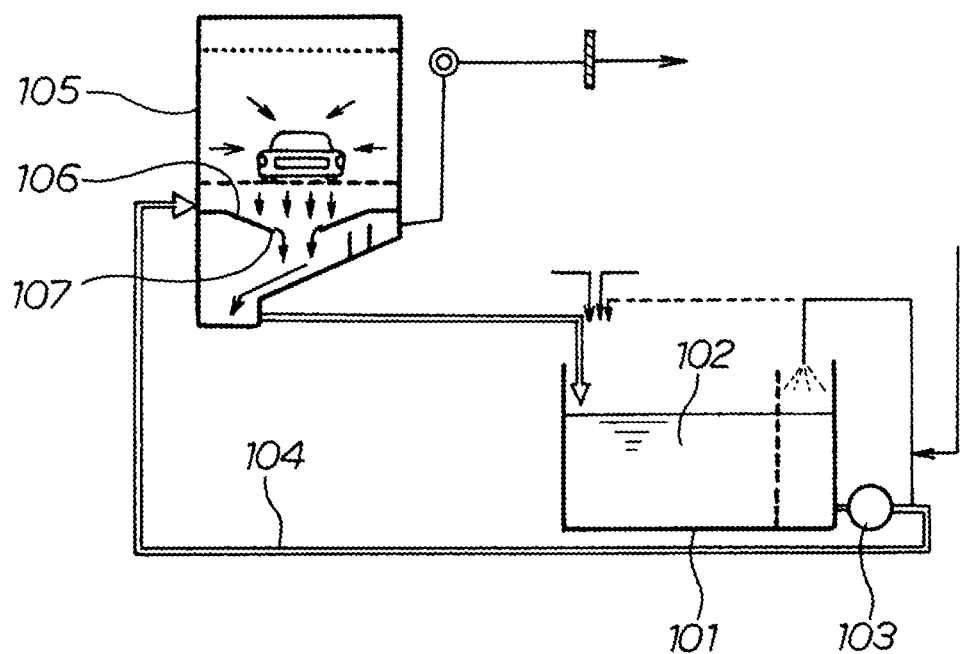
FIG. 9 is a diagrammatical view showing a general configuration of a conventional paint booth.

Operation of the paint mist collecting device 40B will be described with reference to FIGS. 8A and 8B, wherein FIG. 8A illustrates only a flow of the paint-mist-containing air, and FIG. 8B shows only a flow of the cleaning liquid 25. As shown in FIG. 8A, downwardly directed paint-mist-containing air 46 enters the tubular duct 60' from the frustconical intake section 41 and comes in contact with the guide fins 45 of the swirl-generating guide fin unit 44. In this instance, the guide fins 45 force an axial flow of the paint-mist containing air 46 into a rotational movement in the clockwise direction. Due to this clockwise swirling of the paint-mist-containing air 46, a helical vortex 47 is generated downstream of the swirl-generating guide fin unit 44. Advancing movement in a downward direction of the paint-mist-contained air is restricted by the tapered nozzle section 43 and, hence, the paint-mist-containing air can stay within the tubular duct 60 for a relatively long time.

As shown in FIG. 8B, the cleaning liquid 25 is ejected from the nozzles 53 into the circumferential groove 49 on the inner surface of the frustoconical intake section 41 in a direction to form a clockwise swirl flow. The swirling cleaning liquid comes into the swirl-generating guide fin unit 44 where the guide fins 45 promote swirling of the cleaning liquid 25, thus generating a helical vortex 54 as the cleaning liquid 25 flows downstream along the tubular duct 60'. With this arrangement, because the cleaning liquid 25 is forced into a swirling movement as it is ejected into the groove 49 in the inlet section 41 of the tubular duct 60', the cleaning liquid 25 can stays in the tubular duct for a relatively long time. Additionally, because both the paint-mist-containing air and the cleaning liquid form swirl flows (helical vortexes) 47, 54 in the tubular duct 60', a contact time between the paint-mist-containing air and the cleaning liquid 25 increases, and the mist entrainment efficiency of the cleaning liquid increases greatly.

Obviously, various minor changes and modifications are possible in the light of the above teaching. It is to be understood that within the scope of the appended claims the present invention may be practiced otherwise than as specifically described.

What is claimed is:

1. A paint mist collecting device for use in a paint booth for collecting a mist of paint particles produced when a paint is sprayed onto a workpiece within the paint booth while air containing the paint mist and a cleaning liquid are allowed to flow out from an outlet formed at a bottom part of the paint booth, the paint mist collecting device comprising:
 a tubular duct having one end adapted to be connected to the outlet of the paint booth; and
 a swirl-generating guide fin unit disposed inside the tubular duct and configured to force axial flows of the paint-mist-containing air and the cleaning liquid into a rotational movement to thereby generate a helical vortex as the paint-mist-containing air and the cleaning liquid flow downward along the tubular duct,
 wherein the swirl-generating guide fin comprises a plurality of guide fins projecting from an inner surface of the tubular duct and circumferentially spaced at equal intervals, the guide fins being skewed with respect to a longitudinal axis of the tubular duct in a direction to form a clockwise or a counter-clockwise swirl flow of the paint-mist-containing air and the cleaning liquid.

2. The paint mist collecting device according to claim 1, wherein the tubular duct includes a frustconical intake section, a cylindrical intermediate section, and a tapered nozzle section arranged in an axial direction of the tubular duct with the intermediate section disposed between the intake section and the nozzle section, the frustconical intake section having a large-diameter end forming the one end of the tubular duct, the cylindrical intermediate section having a uniform diameter throughout the length thereof, the tapered nozzle section having a diameter gradually reducing in a direction toward an opposite end of the tubular duct, and wherein the swirl-generating guide fin unit is disposed in the intermediate section at a position near a small-diameter end of the frustconical intake section.

3. The paint mist collecting device according to claim 1, wherein the tubular duct has a circumferential groove formed in an inner surface thereof and located adjacent to the one end of the tubular duct, and a liquid-jetting device which jets the cleaning liquid into the circumferential groove to form a swirl flow of the cleaning liquid in a direction same as a direction of rotational movement produced by the swirl-generating guide fin unit.

4. A paint booth comprising:
 a painting pit for receiving therein a workpiece to be painted, the painting pit having a bottom wall and at least one outlet formed in the bottom wall;
 a painting unit disposed in the painting pit for spraying a paint onto the workpiece;
 an air supplying unit which supplies air from above into the painting pit;
 a cleaning liquid supplying unit which supplies a cleaning liquid over the bottom wall of the painting pit, wherein air containing a mist of paint particles produced when the paint is sprayed onto the workpiece and the cleaning liquid are allowed to flow out through the outlet formed in the bottom wall; and
 a paint mist collecting device for collecting the paint mist, the paint mist collecting device comprising:
  a tubular duct connected at one end to the outlet of the painting pit and extending downward; and
  a swirl-generating guide fin unit disposed inside the tubular duct and configured to force axial flows of the paint-mist-containing air and the cleaning liquid into a rotational movement to thereby generate a helical vortex as the paint-mist-containing air and the cleaning liquid flow downward along the tubular duct,
 wherein the swirl generating guide fin unit comprises a plurality of guide fins projecting from an inner surface of the tubular duct and circumferentially spaced at equal intervals, the guide fins being skewed with respect to a longitudinal axis of the tubular duct in a direction to form a clockwise or a counterclockwise swirl flow of the paint-mist-containing air and the cleaning liquid.

5. The paint booth according to claim 4, wherein the tubular duct includes a frustconical intake section, a cylindrical intermediate section, and a tapered nozzle section arranged in an axial direction of the tubular duct with the intermediate section disposed between the intake section and the nozzle section, the frustconical intake section having a large-diameter end forming the one end of the tubular duct, the intermediate section having a uniform diameter throughout the length thereof, the tapered nozzle section having a diameter gradually reducing in a direction toward an opposite end of the tubular duct, and wherein the swirl-generating guide fin unit is disposed in the intermediate section at a position near a small-diameter end of the intake section.

6. The paint booth according to claim 4, wherein the tubular duct has a circumferential groove formed in an inner surface thereof and located adjacent to the one end of the tubular duct, and a liquid-jetting device with jets the cleaning liquid into the circumferential groove to form a swirl flow of the cleaning liquid in a direction same as a direction of rotational movement produced by the swirl-generating guide fin unit.

7. The paint booth according to claim 4, further including a conveyor disposed in the painting pit for conveying the workpiece in a direction along a travel path, wherein the painting pit has a first row of outlets disposed on a right side of the travel path as view in the direction of conveyance of the workpiece, and a second row of outlets disposed on a left side of the travel path as viewed in the direction of conveyance of the workpiece, and wherein the swirl-generating guide fin unit of the paint mist collecting device, which is associated with each of the first row of outlets, is configured to generate a clockwise swirl flow of the paint-mist-containing air and the cleaning liquid, and the swirl-generating guide fin unit of the paint mist collecting device, which is associated with each of the second row of outlets, is configured to generate a counterclockwise swirl flow of the paint-mist-containing air and the cleaning liquid.

8. The paint booth according to claim 7, wherein the painting pit has a third row of outlets aligned with the travel path, and the first and second rows of outlets and the third row of outlets are arranged in a zigzag alignment.

\* \* \* \* \*